(12) United States Patent
Porat-Stoler et al.

(10) Patent No.: US 10,970,254 B2
(45) Date of Patent: Apr. 6, 2021

(54) UTILIZATION OF TAIL PORTIONS OF A FIXED SIZE BLOCK IN A DEDUPLICATION ENVIRONMENT BY DEDUPLICATION CHUNK VIRTUALIZATION

(71) Applicant: International Business Machines Corporation, Armonk, NY (US)

(72) Inventors: Asaf Porat-Stoler, Tel Aviv (IL); Jonathan Fischer-Toubol, Tel Aviv (IL); Shai Tahar, Tel Aviv (IL); Afief Halumi, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 15/969,671

(22) Filed: May 2, 2018

(65) Prior Publication Data
US 2019/0340263 A1 Nov. 7, 2019

(51) Int. Cl.
*G06F 16/00* (2019.01)
*G06F 16/174* (2019.01)
*G06F 16/16* (2019.01)

(52) U.S. Cl.
CPC ........ *G06F 16/1752* (2019.01); *G06F 16/164* (2019.01)

(58) Field of Classification Search
CPC ...... G06F 3/0641; G06F 3/0608; G06F 3/064; G06F 11/1453; G06F 11/1435; G06F 16/1752; G06F 16/1748; G06F 16/174; G06F 16/1744; G06F 16/215; G06F 16/245; G06F 16/00; G06F 16/164; G06F 16/14; G06F 16/24562; G06F 2205/064; G06F 2205/106; G06F 2205/108;
(Continued)

(56) References Cited

U.S. PATENT DOCUMENTS 7,979,403 B2  7/2011  Kedem et al.
8,463,825 B1 * 6/2013  Harty ............... G06F 3/0685
                                                        707/813

(Continued)

OTHER PUBLICATIONS

Shan et al., "Container Layout and Corresponding Reference Management for Dedupe Storage," Veritas Technologies LLC, IP.com, IPCOM000247128D, Aug. 8, 2016, 5 pages.
(Continued)

*Primary Examiner* — Diedra McQuitery
(74) *Attorney, Agent, or Firm* — Zilka-Kotab, P.C.

(57) ABSTRACT

A computer-implemented method according to one embodiment includes receiving data, storing chunks of the data in fixed size blocks in physical storage, and deduplicating a copy of the data. The storing includes splitting some of the data chunks into portions for filling the fixed size blocks. Metadata is stored with the data chunks for chaining the associated portions of the split data chunks together. The deduplicating including creating a pointer to a first of the data chunks. A computer program product for utilizing free space in physical storage, according to another embodiment includes a computer readable storage medium having program instructions embodied therewith. The computer readable storage medium is not a transitory signal per se. The program instructions are readable and/or executable by a computer to cause the computer to perform the foregoing method.

20 Claims, 11 Drawing Sheets

(58) Field of Classification Search
CPC ....... G06F 2212/401; G06F 2212/1044; G06F 2212/7205; G06F 2212/461; G06F 2212/7207; G06F 2212/466
See application file for complete search history.

(56) References Cited

U.S. PATENT DOCUMENTS

| | | | |
|---|---|---|---|
| 8,935,487 B2 | 1/2015 | Sengupta et al. | |
| 9,465,808 B1 * | 10/2016 | Karr | G06F 3/0659 |
| 2006/0190643 A1 | 8/2006 | Kedem et al. | |
| 2012/0159098 A1 * | 6/2012 | Cheung | G06F 12/0261 |
| | | | 711/162 |

OTHER PUBLICATIONS

Venish et al., "Study of Chunking Algorithm in Data Deduplication," Proceedings of the International Conference on Soft Computing Systems, Advances in Intelligent Systems and Computing 398, Springer, 2016, pp. 13-20.

* cited by examiner

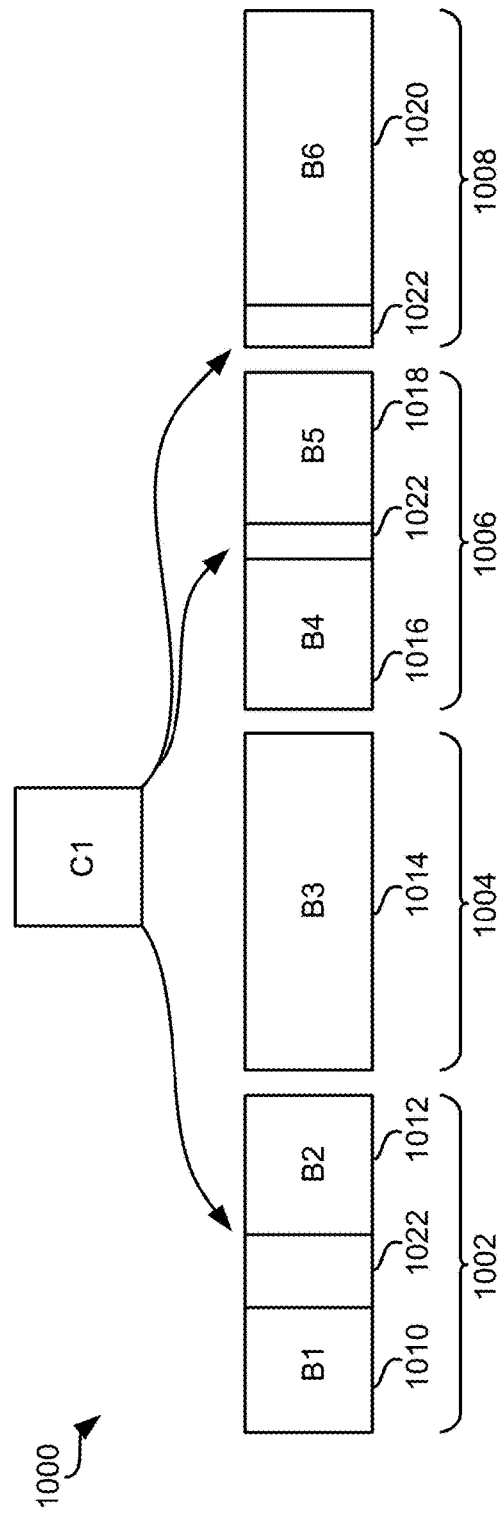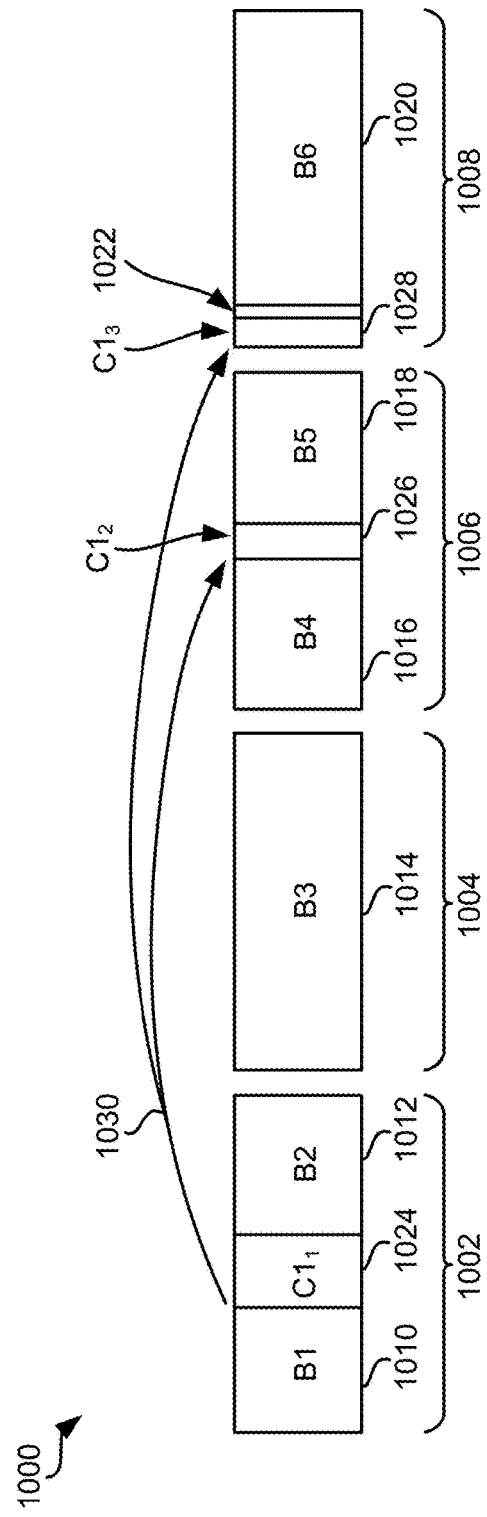
FIG. 10A
FIG. 10B

UTILIZATION OF TAIL PORTIONS OF A FIXED SIZE BLOCK IN A DEDUPLICATION ENVIRONMENT BY DEDUPLICATION CHUNK VIRTUALIZATION

BACKGROUND

The present invention relates to data storage systems, and more specifically, this invention relates to the structures in which data is stored to such data storage systems.

Modern storage systems expand the concept of data reduction by introducing a technique known as deduplication of data. Given a granularity chunk size, the concept of deduplication includes replacing duplicate chunks of data across a system, with pointers to a single instance of the data.

For example, in corporate environments, when an email is sent by a first user to a plurality of other users, to save space in the data storage system that records and saves the email transition, deduplication might include replacing duplicate copies of the sent email with pointers to a single instance of the sent email. This may prevent storage space of the system from being unnecessarily consumed with redundant copies of the same data. This in turn reduces the overall storage requirement in the system.

SUMMARY

A computer-implemented method according to one embodiment includes receiving data, storing chunks of the data in fixed size blocks in physical storage, and deduplicating a copy of the data. The storing includes splitting some of the data chunks into portions for filling the fixed size blocks. Metadata is stored with the data chunks for chaining the associated portions of the split data chunks together. The deduplicating including creating a pointer to a first of the data chunks.

A computer program product for utilizing free space in physical storage, according to another embodiment includes a computer readable storage medium having program instructions embodied therewith. The computer readable storage medium is not a transitory signal per se. The program instructions are readable and/or executable by a computer to cause the computer to perform the foregoing method.

A computer-implemented method for utilizing free space in physical storage, according to another embodiment includes receiving data, splitting a chunk of the data into portions for filling free space in a plurality of fixed size blocks in physical storage, and writing logs each having a respective portion of the split chunk to the free space of the fixed size blocks. A first of the logs includes metadata pointing to another of the other logs. The method further includes deduplicating a copy of the chunk of the data. The deduplicating including creating a pointer to the first log.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 10A is a representation of physical storage environment, in accordance with one embodiment, prior to splitting and writing a chunk of data thereto.

FIG. 10B is a representation of the physical storage environment of FIG. 10A, after splitting and writing the chunk of data thereto.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for utilizing more free space in physical storage environments by splitting deduplicated data into smaller chunks.

In one general embodiment, a computer-implemented method includes receiving data, storing chunks of the data in fixed size blocks in physical storage, and deduplicating a copy of the data. The storing includes splitting some of the data chunks into portions for filling the fixed size blocks.

Metadata is stored with the data chunks for chaining the associated portions of the split data chunks together. The deduplicating including creating a pointer to a first of the data chunks.

In another general embodiment, a computer program product for utilizing free space in physical storage includes a computer readable storage medium having program instructions embodied therewith. The computer readable storage medium is not a transitory signal per se. The program instructions are readable and/or executable by a computer to cause the computer to perform the foregoing method.

In another general embodiment, a computer-implemented method for utilizing free space in physical storage includes receiving data, splitting a chunk of the data into portions for filling free space in a plurality of fixed size blocks in physical storage, and writing logs each having a respective portion of the split chunk to the free space of the fixed size blocks. A first of the logs includes metadata pointing to another of the other logs. The method further includes deduplicating a copy of the chunk of the data. The deduplicating including creating a pointer to the first log.

Figure 1:
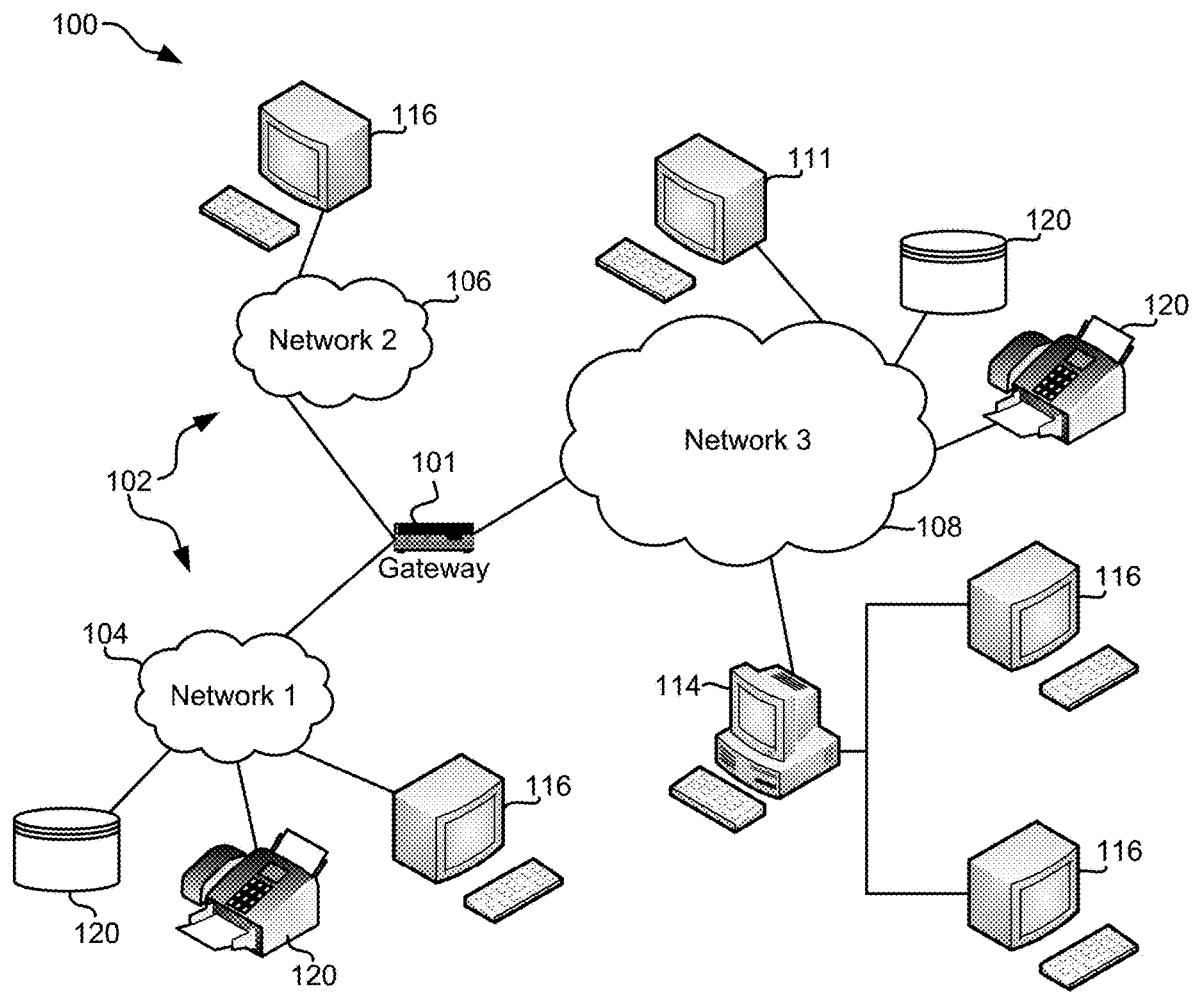
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
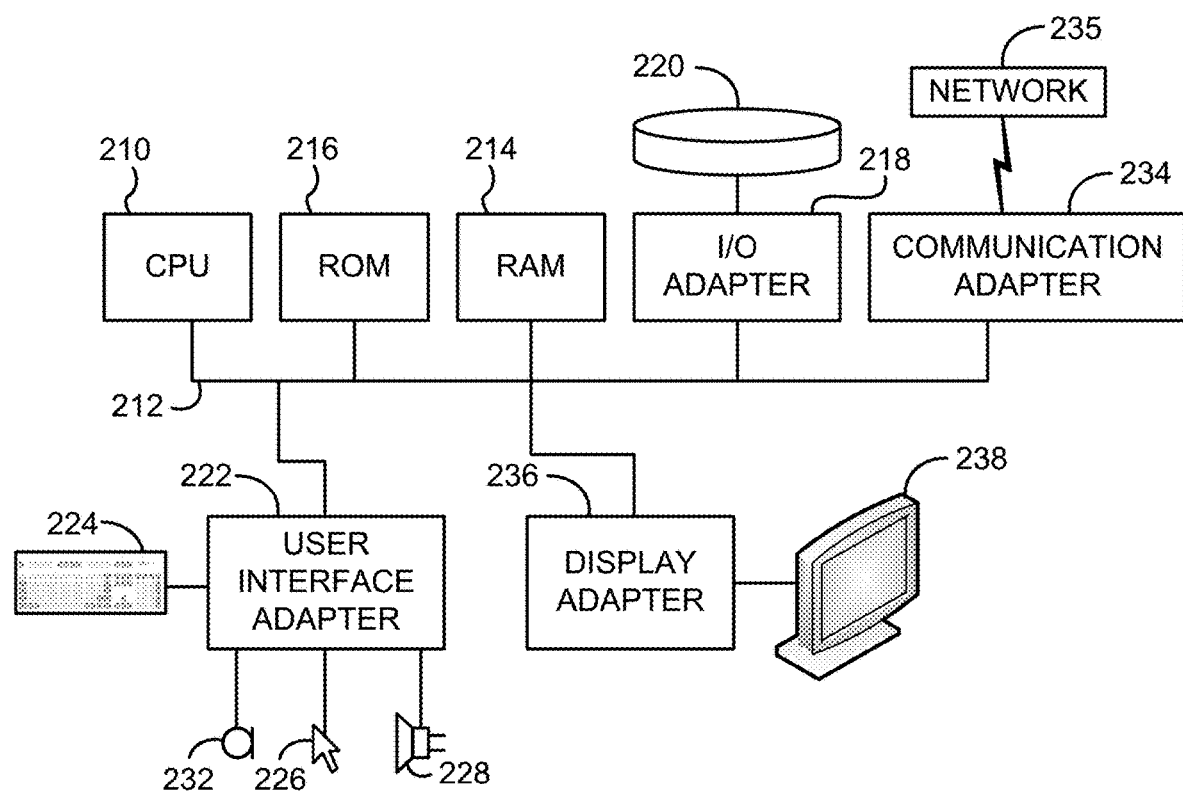
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
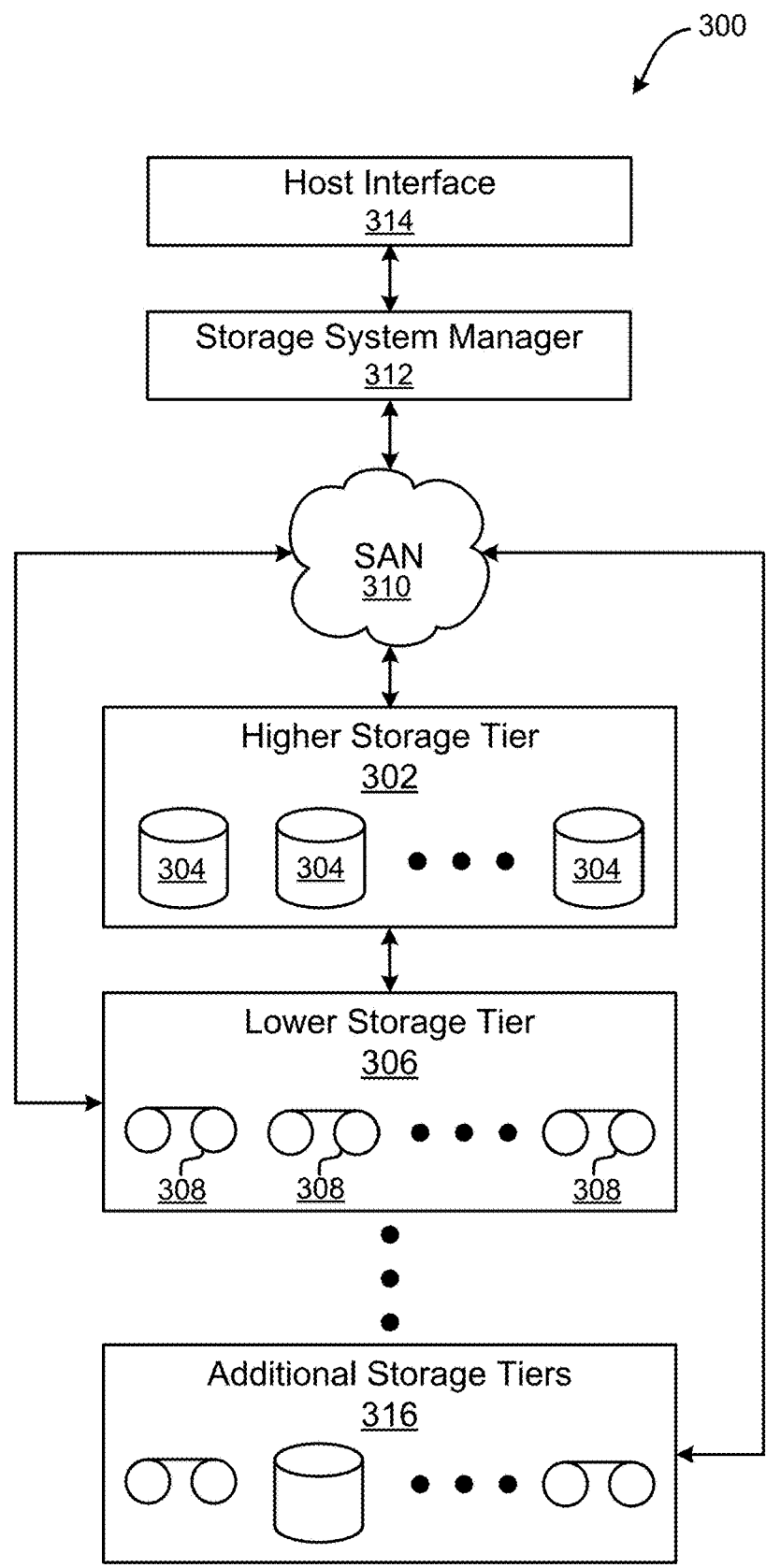
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Data may be stored in storage systems and accessed in accordance with data deduplication, in which duplicate chunks of data across a system are replaced with pointers to a single instance of the data.

The design of conventional deduplication system however poses several challenges. Firstly, the duplicate data should be identified across potentially very large amounts of data. Additionally, once duplicates are found, the system should be able to maintain data in a format containing data references over the entire system.

A popular method for arranging the compressed and deduplicated data on physical storage space, while maintaining performance, includes arranging the data in a format known as log structured array (LSA). In such an arrangement, data is written to disk/cache in a log-structured (journal) format. Accordingly, the physical space of the system is divided into fixed-size blocks. Each block represents an allocation unit and is likely to contain several user writes from different and not adjacent virtual offsets, while the LSA format includes writing to the fixed-size block sequentially from a starting point toward the end of the physical block.

One of the issues encountered with the above method is how to deal with the situation when a fixed-size block is full, and the remaining space does not allow for storing the currently processed user data. Moreover, compression made on the data does not allow a prediction to be made of the output size of the data after processing, even if the deduplicated chunks have a fixed size.

Prior to the present invention, a divided chunk could not be deduplicated. Therefore, known deduplication approaches never used the tail of the fixed-size block, but instead wrote the next data chunk to a new fixed size block. In other words, where a data chunk does not entirely fit in a particular fixed-size block, the entire data chunk is written to a next fixed-size block. This allows the data to be saved entirely and thereafter available for reference; however, here again, the fixed-size blocks are not used efficiently, which has a negative impact on the general reduction ratio of the system. Consequently, wasted space in the system accumulates steadily as data is written to fixed size blocks without utilizing all available space of the fixed size blocks.

Figure 4:
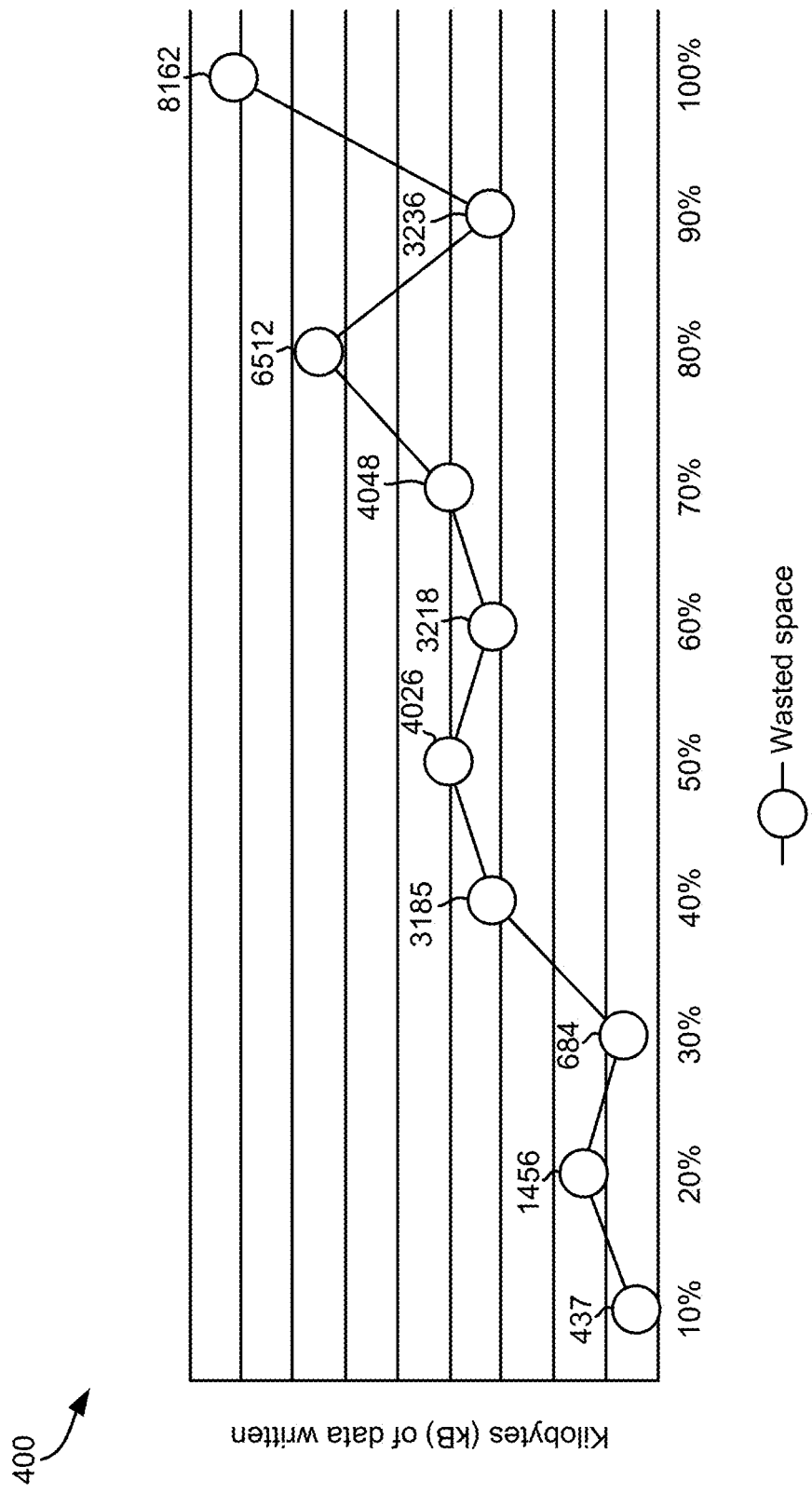
FIG. 4 is a chart depicting the accrual of wasted space in a system when deduplication chunks do not fit in blocks during writing, in accordance with one embodiment.

For purposes of an example, referring now to FIG. 4, diagram 400 depicts the amount of data that would be wasted in each block of a system in respect to the data compression ratio. For example, if a compression ratio of the system is 10%, then a 8192 byte chunk would be compressed to 829 bytes plus overhead of 10 bytes, thus, 839 bytes. A single block of size 32 KB can contain 39 logs of 839 bytes, and thus the wasted space would be 437 bytes. Multiplying the compressed+overhead (839 bytes) by the 39 logs and adding the amount of wasted space (437 bytes) totals to 32 KB. If the data cannot be compressed at all and the compression ratio is 100%, a 8192 bytes chunk won't be compressed at all. Accordingly, with a header size of 10 bytes, the log size will be 8202. A block of 32 KB can contain only 3 such logs and the resulting wasted space will be 8162 bytes.

In each of these use cases, 100% of the blocks in the system will eventually have wasted space. To summarize, the x-axis corresponds to the compression ratio and the y-axis corresponds to the wasted space.

An additional challenge of LSAs is that the invalidation of logs causes fragmentation of the physical device. For some write patterns, such as sequential writes, blocks are completely freed and can be reused. In other patterns, such as random writes, small parts of blocks are fragmented. When the logs are compressed, as previously mentioned, the physical size of each log varies with respect to the compression ratio of the data, which makes reusing small fragmented parts together not feasible with deduplication. One contemplated technique to mitigate this fragmentation includes executing an expensive defragmentation background process. This process however involves reading and writing the valid data from the block, and in some cases decompressing and compressing the data all over again, which is undesirable.

Various embodiments described herein may be used to manage and utilize the free space in a physical device. Such techniques enable the use and/or reuse of any free storage space in a physical device regardless of the physical or virtual sizes of the log, and thus mitigate wasted space in such devices.

Figure 5:
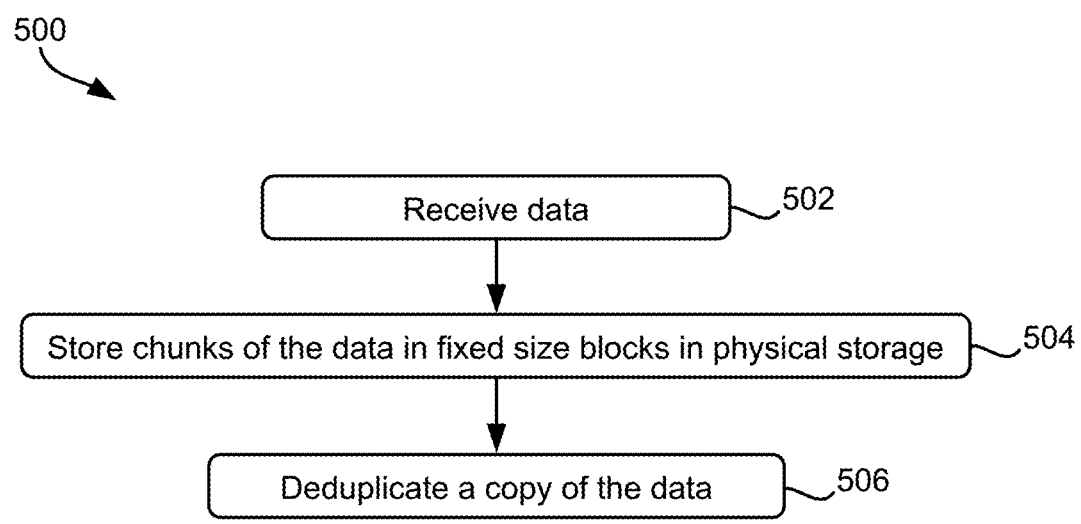
FIG. 5 is a flowchart of a method, in accordance with one embodiment.

Now referring to FIG. 5, a flowchart of a method 500 for managing the physical space in an LSA deduplication and compression environment by virtualizing the deduplication chunks is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where data is received. Data may be received, e.g., by a computer performing method 500, from any one or more sources. For example, according to various approaches, data may be received from, e.g., electronic communications devices, a storage device, a server, a host, etc.

Operation 504 of method 500 includes storing chunks of the data in fixed size blocks in physical storage. According to various approaches, the fixed size blocks in physical storage may be any size. The size may be selected by the user, prespecified, etc. According to one illustrative approach, the fixed size blocks may be 32 kB in size, 64 kB in size, etc. The physical storage may be any type of physical storage, e.g., such as any of the storage devices described with reference to FIG. 3.

According to one approach, storing the data chunks may include compressing the data. Any type of known data compression technique may be used for compressing the data chunks. For example, according to one approach, compressing the data may include removing unoccupied space that exists in the data. According to another approach, compressing the data may additionally and/or alternatively include replacing long character strings of the data with short representations.

Of course, the fixed size blocks may differ in size from the received and/or compressed data. Moreover, the size of portions of the fixed size blocks to which data chunks are to be written may also vary in size. For example, in one approach, the fixed size block may be divided into portions correspond to a preferred reduction ratio. For example, in response to a predefined reduction ratio being zero, a 32 kB fixed size block of physical storage may be configured to include four 8 kB portions, to which data chunks may be written. In contrast, in response to a predefined reduction ratio being 50%, a 32 kB fixed size block of physical storage may be configured to include eight 4 kB portions, to which data chunks may be written. The preferred size of a portion of a fixed size block may moreover change at any time, and thus, writing of data to fixed size blocks is usually not a precisely incremented process.

Accordingly, in some instances, the next data chunk to be written may be greater in size than a remaining portion of the current fixed size block being written to. Thus, in the present embodiment, the storing of operation 504 may include splitting some of the data chunks into portions for filling the fixed size blocks, whereby a first portion of the split data chunk may be stored in one block for filling the block and a second portion of the split data chunk may be stored in a different block, e.g., a next block.

As noted above, prior to the embodiments disclosed in the present disclosure, data chunks split between fixed size blocks could not be deduplicated. As will soon become apparent, the teachings presented herein enable, for the first time, such split data chunks to be deduplicated, even after compression in some approaches.

Figure 6A:
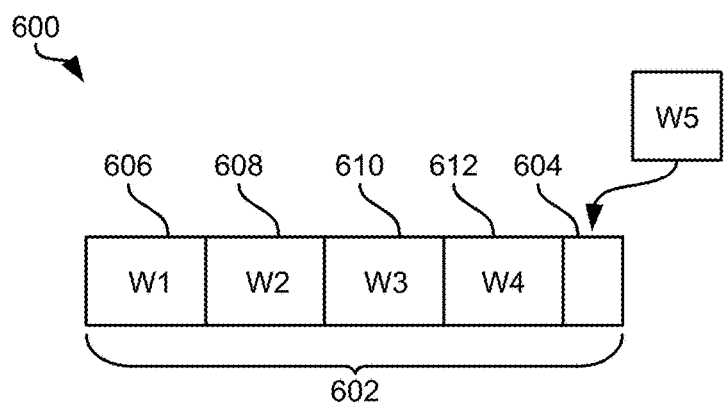
FIG. 6A is a representation of a physical storage environment, in accordance with one embodiment.
Figure 6B:
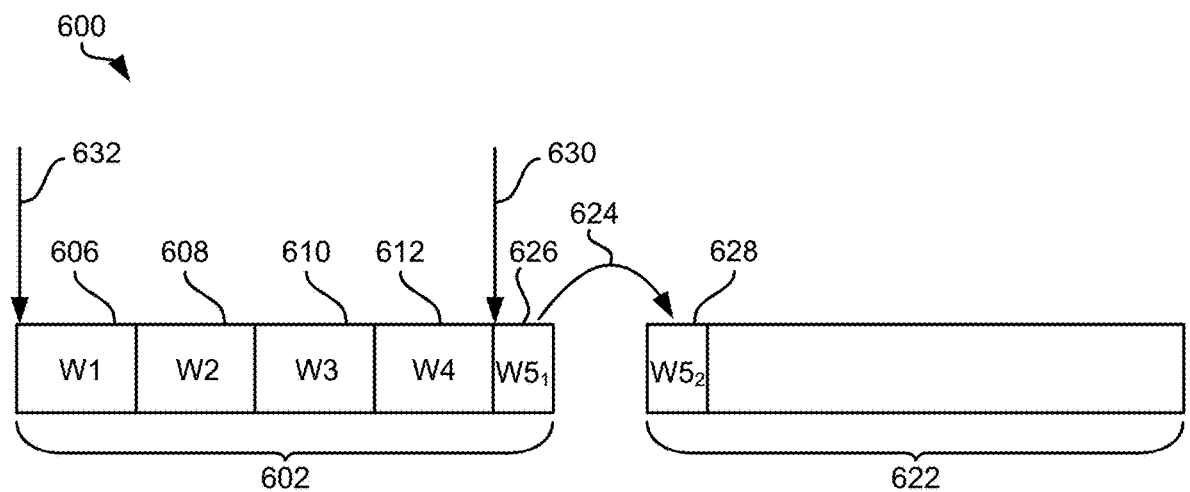
FIG. 6B is a representation of the physical storage environment of FIG. 6A, after splitting and writing a chunk of data thereto.

Referring now to FIGS. 6A-6B, an example of storing chunks of the data in fixed size blocks in physical storage, e.g., by splitting of some of the data chunks into portions, will now be described.

FIGS. 6A-6B depict representations of a physical storage environment 600 having physical storage, in accordance with one embodiment. As an option, the present environment 600 may be implemented in conjunction with features from any other embodiment listed herein, such as those described with reference to the other FIGS. Of course, however, such environment 600 and others presented herein may be used in various applications and/or in permutations which may or may not be specifically described in the illustrative embodiments listed herein. Further, the environment 600 presented herein may be used in any desired environment.

Environment 600 includes a fixed size block 602 in physical storage. A plurality of received chunks of data W1, W2, W3, W4 are stored in the fixed size block 602. According to various approaches, the chunks of data W1, W2, W3, W4 may be stored in the fixed size block 602 in accordance with any type of structured array. According to one example, the chunks of data W1, W2, W3, W4 are stored as logs in a LSA format. For example, in FIG. 6A, the chunks of data W1, W2, W3, W4 may be stored as logs 606, 608, 610, 612 in a LSA (respectively).

As shown in FIG. 6A, the fixed size block 602 is nearly full, and therefore a next received chunk of data may be larger in size than the remaining portion of the fixed size block 602, and therefore the data chunk may not entirely fit in the remaining portion of the fixed size block 602. For example, as shown in FIG. 6A, the chunk of data W5 is larger than the remaining unoccupied portion 604 of the fixed size block 602.

Rather than leaving the tail portion of the fixed size block 602 empty, which would thereby create wasted space, the chunk of data W5 may be split into portions, e.g., see FIG. 6B.

With reference now to FIG. 6B, environment 600 includes the fixed size block 602 and a second fixed size block 622. A first portion $W5_1$ of the split data chunk W5 is stored in the fixed size block 602 for filling the fixed size block 602, e.g., stored as a log 626, and a second portion $W5_2$ of the split data chunk W5 is stored in the second fixed size block 622, e.g., stored as a log 628. In response to the data chunk W5 being split into portions $W5_1$, $W5_2$, the entire fixed size block 602 is filled with data, and no space remains unutilized in the fixed size block 602.

Referring again to method 500, as data is stored in multiple fixed size blocks in physical storage, it may be useful to additionally store metadata which details the association of the split data relative to one another. For example, such metadata may be used for reference in order to retrieve and/or read a requested data chunk that was previously split and stored between different fixed size blocks in physical storage. Accordingly, metadata may be stored with the data chunks for chaining the associated portions of the split data chunks together.

For purposes of an example, referring again to FIG. 6B, metadata may be stored with any one or more of the data chunks W1, W2, W3, W4, W5₁, W5₂ for chaining the associated portions W5₁, W5₂ of the split data chunks together. According to one approach, the metadata may be stored with a first portion of the split data chunk in a log. For example, according to one approach the chaining between the associated portions W5₁, W5₂ of the split data chunks may be established by metadata that is stored with the first portion W5₁ of the split data chunk W5 in the log 626 of the fixed size block 602. For purposes of an example, the established chaining between the associated portions W5₁, W5₂ is illustrated by the arrow 624.

Various other approaches of storing metadata will be described elsewhere herein, e.g., see FIGS. 7A-7B.

Referring again to FIG. 5, method 500 includes deduplicating a copy of the data, e.g., see operation 506. Deduplication techniques used in various embodiments may be based on known techniques, and adapted to include the teachings herein, as would become apparent to one skilled in the art upon reading the present descriptions. In one illustrative approach, deduplication may include creating a pointer to a first of the data chunks. For example, referring again to FIG. 6B, according to one approach, the deduplicating may include creating a pointer 630 to the log 626 having the first data chunk portion W5₁. According to another approach, the deduplicating may additionally and/or alternatively include creating a pointer 632 to the log 606 having the first data chunk W1, or one of the other data chunks W2-W4. The deduplicated copy of the data may be accessed, e.g., in response to receiving a request for the deduplicated copy of the chunk of the data W5. Subsequent accessing of the deduplicated copy of the data will be described elsewhere herein, e.g., see FIGS. 8 and 12.

Method 500 may be used to improve reduction ratios in a system by storing a deduplication data chunk in a single virtual log, even if the chunk of data is physically split and stored in several physical logs. By now enabling deduplication data chunks to be physically split yet virtually connected as a single deduplication data chunk, the deduplication ratio can be significantly increased. This in turn improves the efficiency of a system performing method 500, e.g., by allowing fixed size blocks to be filled with data, rather than having an unused tail portion of the block.

Furthermore, devices performing method 500 may as a result experience mitigation of expensive defragmentation and/or garbage collection processes. This is because unoccupied remaining portions of data storage blocks no longer need to be left unoccupied as a result of a data chunk being greater in size than the free space of a block. Specifically, the metadata allows such portions to be filled with split data chunks, and thereby free space within the block is utilized. Such advantages are moreover enabled even where certain circumstances require a defragmentation process to occur, such as due to overwrites in higher reduction ratio scenarios. In such circumstances, free holes within the blocks may be used to allow deduplication on the copied data, while minimizing the amount of data that should be copied. The benefits of this illustrative utilization of available space are exemplified by diagram 400 of FIG. 4, which is discussed above. In sharp contrast, using various embodiments described herein, the tail of a fixed size block is utilized.

Figure 7A:
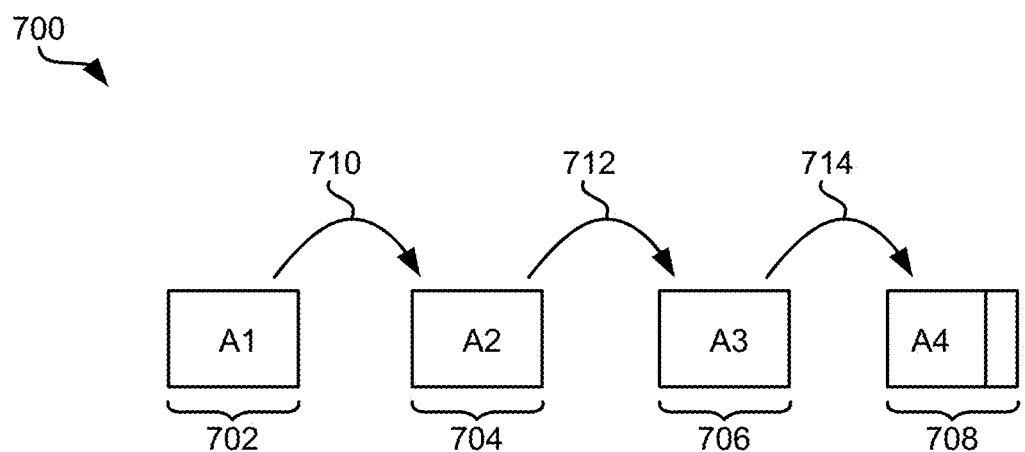
FIG. 7A is a representation of a physical storage environment, in accordance with one embodiment.
Figure 7B:
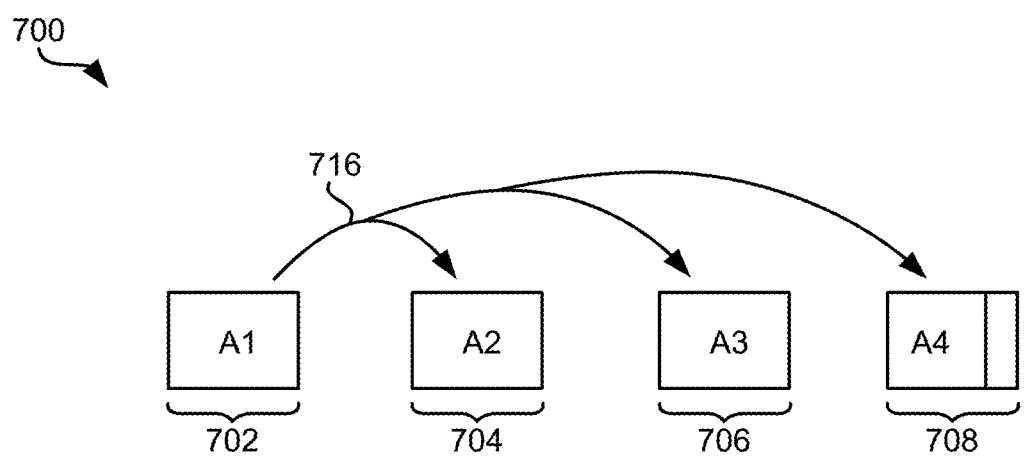
FIG. 7B is a representation of a physical storage environment, in accordance with one embodiment.

FIGS. 7A-7B depict various metadata storage techniques in a physical storage environment 700, in accordance with various embodiments. As an option, the present environment 700 may be implemented in conjunction with features from any other embodiment listed herein, such as those described with reference to the other FIGS. Of course, however, such environment 700 and others presented herein may be used in various applications and/or in permutations which may or may not be specifically described in the illustrative embodiments listed herein. Further, the environment 700 presented herein may be used in any desired environment.

Referring now to FIG. 7A-7B, environment 700 includes a plurality of portions A1, A2, A3, A4 of a split data chunk. Each of the data chunk portions A1, A2, A3, A4 may be stored as logs 702, 704, 706, 708 (respectively) in separate fixed size blocks.

Metadata may be used for chaining the various logs 702, 704, 706, 708 together, thereby creating a single virtual log that can be deduplicated. According to various approaches, such metadata may be stored at any one or more locations. In such approaches, such metadata preferably may be used to identify a next log where data chunk portions are stored as a plurality of logs.

For example, according to one approach, such metadata may be stored explicitly inside a log itself. For example, referring to FIG. 7A, metadata for chaining the logs 702, 704, 706, 708 together may be stored in a plurality of the logs. In such an example, the metadata of each individual log may point to the next log. For example, metadata stored with the log 702 points to the next log 704, e.g., pointer 710 illustrates such pointing. Moreover, metadata stored with the log 704 points to the next log 706, e.g., pointer 712 illustrates such pointing. Moreover, metadata stored with the log 706 points to the next log 708, e.g., pointer 714 illustrates such pointing. Accordingly, the metadata of each log may be used to identify a next log. As a result, the logs 702, 704, 706, 708 may be read serially one after the other in the order of the chaining. This chaining of the logs 702, 704, 706, 708 thereby in effect chains the data chunk portions A1, A2, A3, A4 together as a single virtual data chunk, despite being stored as portions of data chunks in two or more fixed size blocks.

In another approach, metadata that may be used to identify the location of more than one other log may be stored in a single log, e.g., the first log. Specifically, the metadata may be stored with a first portion of the split data chunk in a log. Referring now to FIG. 7B, metadata for chaining the logs 702, 704, 706, 708 together is stored with the first portion A1 of the split data chunk, e.g., see the log 702. The metadata stored in the log 702 with the first portion A1 of the split data chunk is illustrated pointing to the remaining associated logs 704, 706, 708, e.g., pointer 716 illustrates such pointing. Accordingly, the logs 702, 704, 706, 708 may be read by first reading metadata on the first log 702, and thereafter the remaining associated logs 704, 706, 708 may be read as a result of the corresponding metadata being stored in the first log 702. This virtual chaining of the logs establishes a single virtual log. This virtual log may be deduplicated.

FIGS. 7A-7B illustrate various approaches for storing embedded metadata within data on a storage device in order to reduce the required amount of fast access memory. In systems with a limited size of fast access memory, where it is desired to keep compact and efficient containers in the RAM, for each virtual log, a pointer may be stored only to the first physical log, and the pointer may be embedded to the other metadata stored on the physical device. This would desirably not increase the RAM usage in a device storing/organizing data using such techniques. These storage techniques provide greater processing efficiencies and less system usage than would otherwise result from storing a deduplication chunk in a single physical log (which would likely result in an undesirable increase in RAM usage).

Additionally, storage of metadata for chaining the logs together enables the removal of the connection between block size and deduplication chunk size, as a deduplicated chunk can span several blocks.

Moreover, the chaining between logs advantageously mitigates the inflation of deduplication metadata, because the metadata only needs to refer to the first portion of the split chunk of data. Then, the metadata stored with the chunk(s) themselves enable retrieval of all of the portions.

As a result of being able to split data chunks into separate logs across several blocks, all space in the blocks may be fully utilized. This will advantageously mitigate having to defragment a system to utilize partially used blocks.

It should be noted that such advantages will result in increased processing efficiencies in a device, such as a computer, that is performing one or more methods and/or other processes described elsewhere herein. This is because devices performing one or more of such methods and/or other processes may retrieve data chunks by simply reading the metadata which chain the logs and/or portions of the split data chunks together. Specifically, this retrieving will not necessarily include having to blindly search for a next log, or each portion of a split data chunk across potentially very large amounts of dispersed data (due to tails of many fixed size blocks conventionally not being utilized), because metadata, stored in accordance with one or more approaches described herein, indicates such locations. Of course, this will correlate to relatively faster retrieval of requested data than otherwise would be available in conventional practices.

Figure 8:
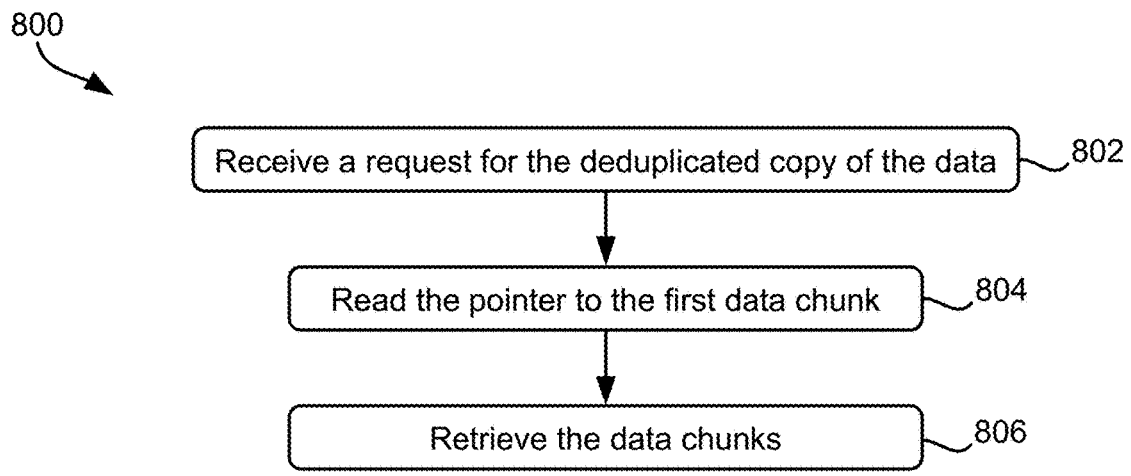
FIG. 8 is a flowchart of a method, in accordance with one embodiment.

Now referring to FIG. 8, a flowchart of a method 800 for fulfilling a received request for a deduplicated copy of data is shown according to one embodiment. The method 800 may be performed in accordance with the present invention in any of the environments depicted in FIGS. 1-3 and 6A-7B, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

Method 800 may be initiated in response to receiving a request for the deduplicated copy of the data, e.g., see operation 802. As mentioned above, data that is saved in accordance with method 500 and/or various other processes described elsewhere herein may be later accessed in response to receiving a request for such data. Thus, in one approach, the request received in operation 802 may correspond to the deduplicated copy of the data of method 500.

In one approach, to fulfill the request for the deduplicated copy of the data, a pointer to the first data chunk may be read, e.g., see operation 804. According to another approach, to fulfill the request for the deduplicated copy of the data, a pointer to the first of the logs may additionally and/or alternatively be read.

In response to locating the first data chunk in the system, the data chunks may be retrieved, e.g., see operation 806. Of course, as described in detail elsewhere herein, the data may have been stored in a plurality of fixed size block, with portions of one of more of the chunks potentially being split between different fixed size blocks. Accordingly, in one approach, the metadata chaining the portions of the split data chunks together may be read for retrieving the portions of the split data chunks.

For purposes of an example, with reference again to FIG. 6B, assume that a request for data has been received for the deduplicated copy of the data chunk W5 that was split into portions $W5_1$, $W5_2$, and stored in the fixed size blocks 602, 622. To fulfill the request, the pointer 630 which points to the log 626 having the first portion $W5_1$ may be read. With the location of the first portion of the data chunk identified, the portions may be retrieved using the metadata stored with the first portion $W5_1$. Moreover, because the data chunk W5 is split into portions $W5_1$, $W5_2$ between the fixed size blocks 602, 622, the retrieving may include reading the metadata chaining the portions $W5_1$, $W5_2$ of the split data chunk W5 together.

Additional embodiments which involve space efficient management of metadata in fast access memory of a system will now be described (see method 900).

Figure 9:
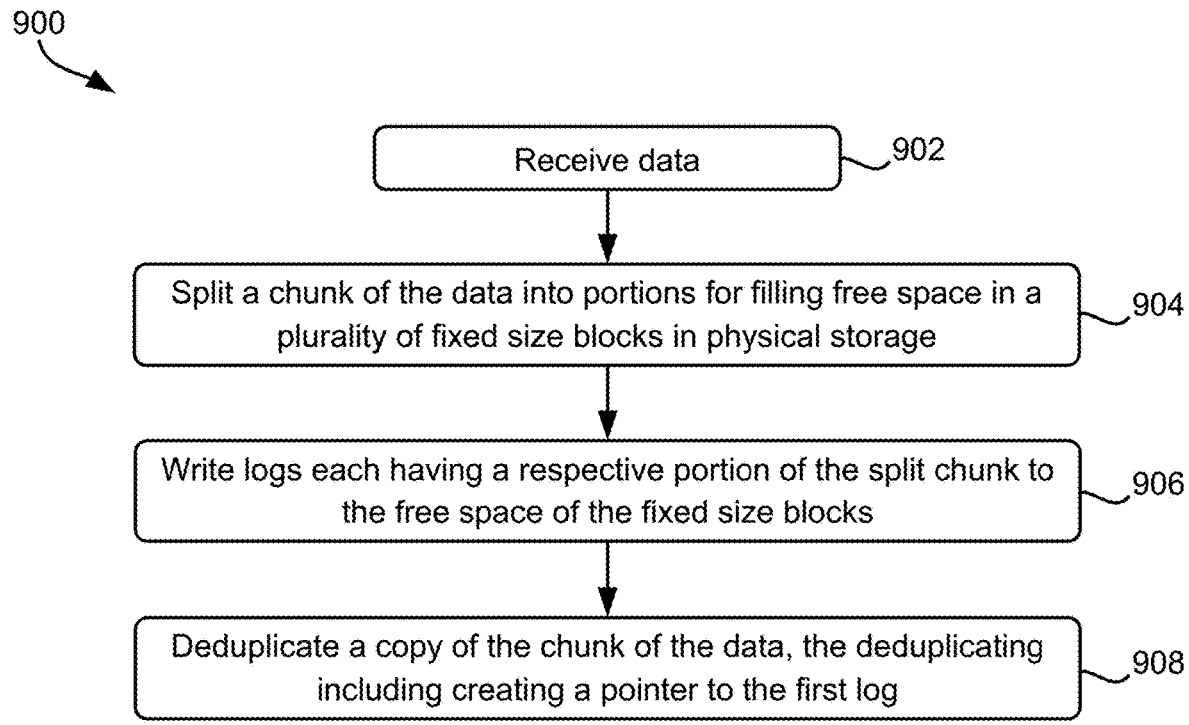
FIG. 9 is a flowchart of a method, in accordance with one embodiment.

Now referring to FIG. 9, a flowchart of a method 900 for utilizing free space in physical storage, is shown according to one embodiment. The method 900 may be performed in accordance with the present invention in any of the environments depicted in FIGS. 1-3 and 6A-7B, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

During the steady state operations of a LSA, holes may accumulate in the physical blocks where the data is no longer needed. For example, as a result of overwriting, holes may accumulate as a result of chunks of data stored in a block being compressed to a smaller size. In a more specific example, an 8 kB chunk of data stored in a block may be compressed to 5 kB as a result of overwriting, thus leaving a 3 kB hole in the block. Such holes may be filled with new data, but there is no guarantee that the size of the hole will be big enough to accommodate a deduplication chunk of data. Accordingly, conventional systems often do not utilize this space until the block is fully freed. The block can be freed either by additional user write(s), or by an expensive defragmentation process. As will be now described in method 900, data chunks that do not fit into available free space may be split into portions, thereby enabling the splitting of writes among multiple smaller logs to fill the available free space.

As shown in FIG. 9, method 900 may initiate with operation 902, where data is received. Data may be received, e.g., by a computer performing method 900, from any one or more sources. For example, according to various approaches, data may be received from, e.g., electronic communications, a storage device, a server, etc.

Operation 904 of method 900 includes splitting a chunk of the data into portions for filling free space, e.g., holes, in a plurality of fixed size blocks in physical storage. In one approach, the fixed size blocks in physical storage may be in a LSA format.

According to one approach, the splitting of a chunk of the data into portions for filling free space may be performed in response to knowing the size of at least some of the free spaces in a plurality of fixed size blocks in physical storage. However, according to another approach, where the size of free spaces in a plurality of fixed size blocks in physical storage are not known, an audit may be performed prior to the splitting of the data chunk, to determine the size of the size of free spaces in a plurality of fixed size blocks.

In response to the chunk of data being split, logs each having a respective portion of the split chunk may be written to the free space of the fixed size blocks, e.g., see operation 906. For example, assume that the data chunk has been split into three portions for filling three free spaces in three separate blocks. In such an example, a first log having the first portion of the split data chunk may be written to and thereby fill the free space in the first block, a second log having the second portion of the split data chunk may be written to and thereby fill the free space in the second block, and a third log having the third portion of the split data chunk may be written to and thereby fill the free space in the third block. A further similar example of splitting data chunks for filling free space in blocks will be described elsewhere herein, e.g., see FIGS. 10A-10B.

Similar to the advantages offered by other methods and processes described elsewhere herein, method 900 advantageously mitigates expensive defragmentation and/or garbage collection processes in data storage systems. This is because unoccupied free space of fixed size blocks is filled, rather than being left unoccupied after being freed up.

In response to splitting data chunks into portions for filling free space, it may be desirable to chain portions of the split data to one another, e.g., for later reading and/or retrieving operations. Accordingly, in one approach, a first of the logs may include metadata pointing to another of the other logs. For example, again assuming that the data has been split into at least three portions, the first log may include metadata pointing to a second one of the logs, and the second log may include metadata pointing to a third of the logs.

According to other approaches, the first log may additionally and/or alternatively include metadata pointing to all of the other logs, e.g., see FIG. 10B.

With continued reference to FIG. 9, operation 908 of method 900 includes deduplicating a copy of the chunk of the data. According to a preferred approach, the deduplicating includes creating a pointer to the first log.

In systems with a limited size of fast access memory, where it is desired to keep compact and efficient containers in the RAM, for each virtual log, a pointer may be stored only to the first physical log, and the pointer may be embedded to the other metadata stored on the physical device. This would desirably not increase the RAM usage in a device performing method 900. These storage techniques provide greater processing efficiencies and less system usage than would otherwise result from storing a deduplication chunk in a single physical log (which would likely result in an undesirable increase in RAM usage).

FIGS. 10A-10B and 11A-11B depict physical storage environments 1000, 1100 in accordance with various embodiment. As an option, the present environments 1000, 1100 may be implemented in conjunction with features from any other embodiment listed herein, such as those described with reference to the other FIGS. Of course, however, such environments 1000, 1100 and others presented herein may be used in various applications and/or in permutations which may or may not be specifically described in the illustrative embodiments listed herein. Further, the environments 1000, 1100 presented herein may be used in any desired environment.

Referring now to FIGS. 10A-10B, environment 1000 includes a plurality of fixed size blocks 1002, 1004, 1006, 1008. Each of the fixed size blocks 1002, 1004, 1006, 1008 include one or more logs, e.g., see logs 1010, 1012, 1014, 1016, 1018, 1020. Each of the logs 1010, 1012, 1014, 1016, 1018, 1020 include data stored therein, e.g., the logs 1010, 1012, 1014, 1016, 1018, 1020 include the data B1, B2, B3, B4, B5, B6 stored therein (respectively).

As illustrated in FIG. 10A, some of the fixed size blocks of environment 1000 also include free space, e.g., see free space 1022 of the fixed size blocks 1002, 1006, 1008.

According to one approach, assume for purposes of an example, that a chunk of data C1 has been received. Accordingly, the received chunk of data C1 may be split into portions for the filling free space 1022 in the fixed size blocks 1002, 1006, 1008, e.g., see FIG. 10B.

Referring now to FIG. 10B, the chunk of data C1 has been split into portions $C1_1$, $C1_2$, $C1_3$. Logs 1024, 1026, 1028 each have a respective portion $C1_1$, $C1_2$, $C1_3$ of the split chunk C1, and fill at least portions of the free space 1022 of the fixed size blocks 1002, 1006, 1008 when written thereto. For example, the portion $C1_3$ of the log 1028 fills a portion of what was previously the free space 1022 of the fixed size block 1008. Note that the fixed size block 1008 still includes a portion of free space 1022, which may be filled by other received data.

According to one approach, the first log 1024 may include metadata pointing to all of the other logs, e.g., see arrow 1030 pointing from the first log 1024 to the remaining logs 1026, 1028 associated with the split chunk of data C1.

According to one approach, only the deduplication metadata pointing to the first log may reside in the fast access memory, and the metadata pointing to the other logs may reside in the physical device. Such an approach would further promote efficiency in environment 1000, because in order to retrieve the chunk of data C1, only metadata pointing to portion $C1_1$ would be stored in fast access memory. Accordingly, the remaining space in fast access memory could remain available for other tasks. Such an approach advantageously does not unnecessarily consume the processing potential of a device, such as a computer, performing the operations described in FIGS. 10A-10B.

Figure 11A:
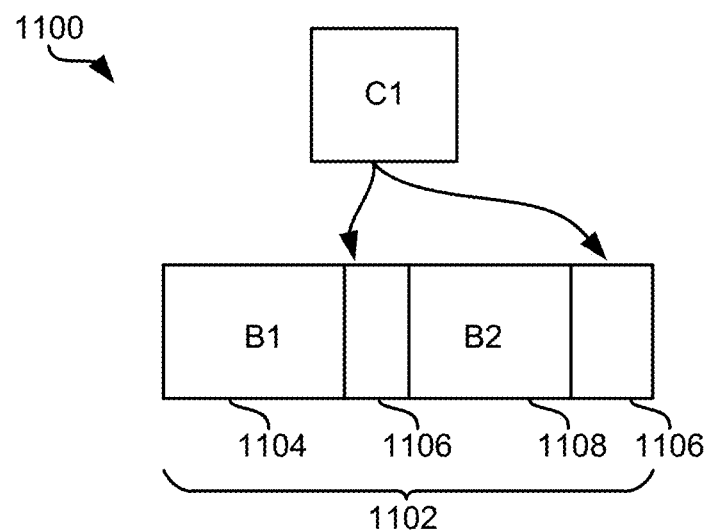
FIG. 11A is a representation of a physical storage environment, in accordance with one embodiment, prior to splitting and writing a chunk of data thereto.
Figure 11B:
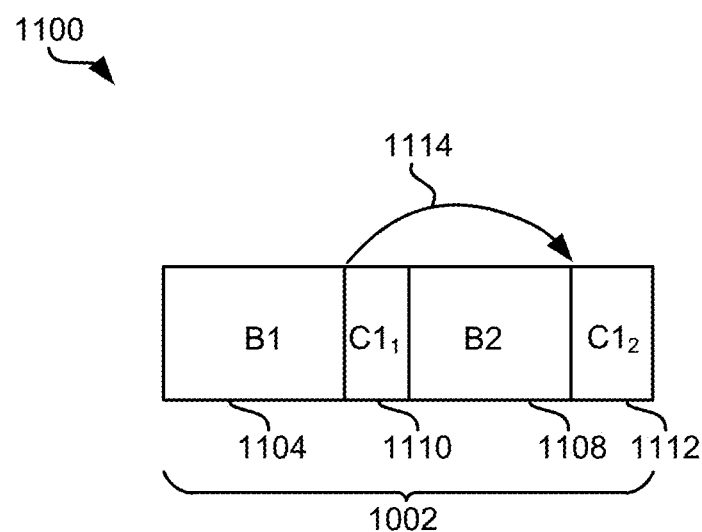
FIG. 11B is a representation of the physical storage environment of FIG. 11A, after splitting and writing the chunk of data thereto.

Referring now to FIGS. 11A-11B, according to another embodiment, a chunk of data may be split into portions for filling more than one portion of free space of a fixed size block in physical storage.

Referring now to FIG. 11A, assume that environment 1100 includes a fixed size block 1102. The fixed size block 1102 includes logs 1104, 1108. Each of the logs 1104, 1108 have data B1, B2 stored therein (respectively).

The fixed size block 1102 of environment 1100 also includes various portions of free space 1106.

According to one approach, assume for purposes of an example, that a chunk of data C1 has been received. Accordingly, the chunk of data C1 may be split into portions for the filling free space 1106 in the fixed size block 1102, e.g., see portions $C1_1$, $C1_2$ in FIG. 11B.

With reference now to FIG. 11B, logs 1110, 1112 each have a respective portion $C1_1$, $C1_2$ of the split chunk C1, and fill at least portions of the free space of the fixed size block 1102 when written thereto. Additional portions of data chunk C1 (if any) may be written to one or more other fixed size blocks (not shown).

According to one approach, the first log 1110 may include metadata pointing to all of the other logs, e.g., see arrow 1114 pointing from the first log 1104 to the remaining log 1112 associated with the split chunk of data C1.

According to various approaches, data that is split for utilizing free space in physical storage may be later retrieved, e.g., see FIG. 12.

Figure 12:
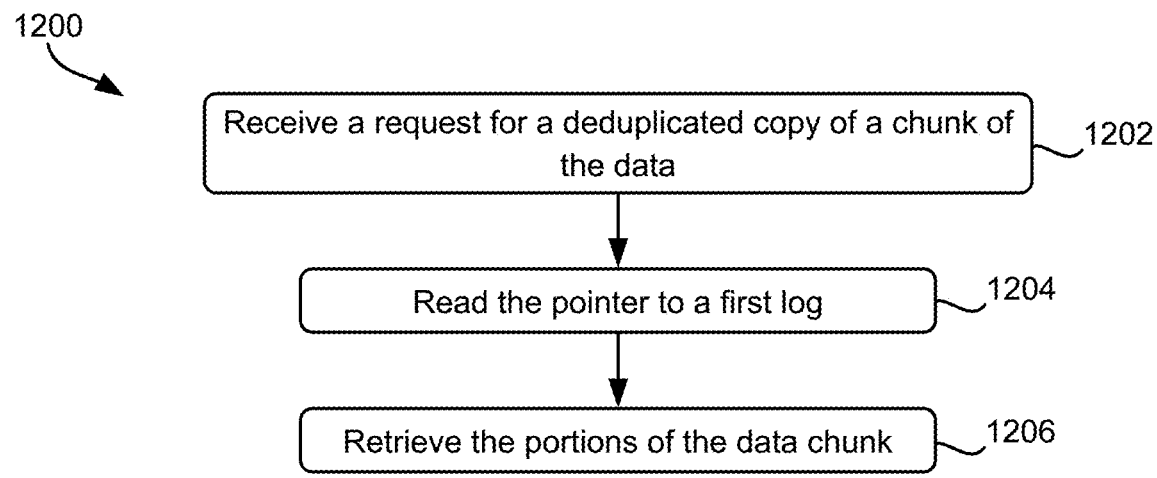
FIG. 12 is a flowchart of a method, in accordance with one embodiment.

Now referring to FIG. 12, a flowchart of a method 1200 is shown according to one embodiment. The method 1200 may be performed in accordance with the present invention in any of the environments depicted in FIGS. 1-3, 6A-7B and 10-11B among others, in various embodiments. Of course, more or less operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

Method 1200 may be initiated in response to receiving a request for a deduplicated copy of the chunk of data, e.g., see operation 1202. The request received in operation 1202 may correspond to the deduplicated copy of a chunk of data stored in other methods and/or processes described elsewhere herein.

To fulfill the request for the deduplicated copy of the data, the pointer to a first log may be read, e.g., see operation 1204. Identifying where the first log is within physical storage, e.g., via the pointer, may be important for identifying the location(s) at which the deduplicated chunk of data was saved in physical memory of a system.

In response to locating the first log, the portions of the data chunk may be retrieved, e.g., see operation 1206.

Of course, the data chunk may have been split into portions for filling free space in one or more fixed size blocks in physical storage. Accordingly, in one approach, the retrieving of operation 1206 may include reading the metadata in the first log and using said metadata for retrieving the other portions of the split data chunk from the one or more fixed size blocks.

For purposes of an example, with reference again to FIG. 10B, assume that a request for the deduplicated copy of the chunk of data C1 has been received. To fulfill the request, a pointer which points to the first log 1024 having the first data chunk $C1_1$ may be read. With the location of the first log identified, metadata of the first log may be read and used for retrieving the remaining portions $C1_2$, $C1_3$ of the split data chunk C1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving data;
dividing the received data into chunks of data;
storing a first subset of the data chunks in fixed size blocks in physical storage;
splitting a second subset of the data chunks into portions;
storing the portions of the second subset of the data chunks in at least some of the fixed size blocks, wherein storing the second subset of the data chunks thereby fills at least some portions of the fixed size blocks not filled by the first subset of the data chunks,
storing, with the data chunks in at least one of the fixed size blocks containing at least one of the portions, metadata for chaining associated portions of the second subset of the data chunks together; and
deduplicating the data, the deduplicating including creating a pointer to a first of the portions.

2. The computer-implemented method of claim 1, wherein the data chunks are stored as logs in a log structured array.

3. The computer-implemented method of claim 1, wherein the metadata is stored in a first of the fixed size blocks, wherein the metadata points to a next of the fixed size blocks.

4. The computer-implemented method of claim 1, wherein the metadata is stored with a first of the portions of the second subset of the data chunks in a log.

5. The computer-implemented method of claim 4, wherein the metadata stored with the first of the portions of the second subset of the data chunks points to at least two other portions of the second subset of the data chunks in at least two other fixed size blocks.

6. The computer-implemented method of claim 1, wherein at least some of the portions of the second subset of the data chunks differ in size.

7. The computer-implemented method of claim 1, comprising:
   receiving a request for the deduplicated data;
   reading the pointer to the first of the portions; and
   retrieving the portions, wherein the retrieving includes reading the metadata chaining the second subset of the data chunks together for retrieving the portions.

8. A computer program product for utilizing free space in physical storage, the computer program product comprising a non-transitory computer readable storage medium having program instructions embodied therewith, the program instructions readable and/or executable by a computer to cause the computer to perform a method comprising:
   receiving, by the computer, data;
   storing, by the computer, chunks of the data in fixed size blocks in physical storage,
   wherein the storing includes splitting some of the data chunks into portions for filling the fixed size blocks;
   storing, with the data chunks in at least one of the fixed size blocks containing at least one of the portions, metadata for chaining associated portions of the split data chunks together; and
   deduplicating, by the computer, the data, the deduplicating including creating a pointer to a first of the data chunks.

9. The computer program product of claim 8, wherein the data chunks are stored as logs in a log structured array.

10. The computer program product of claim 8, wherein the metadata points to a next fixed size block.

11. The computer program product of claim 8, wherein the metadata is stored with a first portion of a first of the split data chunks, in a log.

12. The computer program product of claim 11, wherein the metadata stored with the first portion of the first split data chunk points to at least two other portions of the first split data chunk stored in two or more other fixed size blocks.

13. The computer program product of claim 8, wherein storing the data chunks includes compressing the data.

14. The computer program product of claim 8, the method comprising:
   receiving, by the computer, a request for the deduplicated data;
   reading, by the computer, the pointer to the first data chunk; and
   retrieving, by the computer, the data chunks, wherein the retrieving includes reading the metadata chaining the portions of the split data chunks together for retrieving the portions of the split data chunks.

15. A computer-implemented method for utilizing free space in physical storage, the method comprising:
   receiving data;
   splitting a chunk of the data into portions for filling free space in a plurality of fixed size blocks in physical storage;
   writing logs each having a respective portion of the split chunk to the free space of the fixed size blocks, wherein a first of the logs includes metadata pointing to another of the other logs; and
   deduplicating of the chunk of the data, the deduplicating including creating a pointer to the first log,
   wherein the first log includes metadata pointing to a second one of the logs,
   wherein the second log includes metadata pointing to a third of the logs.

16. The computer-implemented method of claim 15, comprising:
   receiving a request for the deduplicated chunk of the data;
   reading the pointer to the first log; and
   retrieving the portions of the data chunk, wherein the retrieving includes reading the metadata in the first log and using said metadata for retrieving the portions of the split data chunk.

17. The computer-implemented method of claim 15, wherein the first log is different than the third log.

18. The computer program product of claim 8, wherein a first of the data chunks is split into at least three portions, wherein each portion of the at least three portions is stored in a different one of the fixed size blocks, wherein each portion of the at least three portions is smaller than the fixed size block in which it is stored.

19. The computer-implemented method of claim 15, wherein the fixed size blocks in physical storage are in a log structured array format.

20. The computer-implemented method of claim 15, wherein storing the data chunks includes compressing the data.

* * * * *